(12) United States Patent
Ackerley et al.

(10) Patent No.: US 7,594,438 B2
(45) Date of Patent: Sep. 29, 2009

(54) INERTIAL SENSOR HAVING A FLEXING ELEMENT SUPPORTING A MOVABLE MASS

(75) Inventors: Nicholas Jason Ackerley, Ottawa (CA); Geoffrey Stewart Bainbridge, Ottawa (CA)

(73) Assignee: Nanometrics Inc., Ontario (CA)

( * ) Notice: Subject to any disclaimer, the term of this patent is extended or adjusted under 35 U.S.C. 154(b) by 88 days.

(21) Appl. No.: 11/945,052

(22) Filed: Nov. 26, 2007

(65) Prior Publication Data

US 2008/0148851 A1 Jun. 26, 2008

(30) Foreign Application Priority Data

Nov. 28, 2006 (CA) .................... 2569159

(51) Int. Cl.
*G01P 15/10* (2006.01)
(52) U.S. Cl. ................. 73/514.36; 73/514.29
(58) Field of Classification Search ............ 73/514.01, 73/514.29, 515.16, 514.32, 514.38, 514.24, 73/514.36
See application file for complete search history.

(56) References Cited

U.S. PATENT DOCUMENTS

| 3,636,774 | A | | 1/1972 | Allison |
| 5,134,594 | A | | 7/1992 | Woo |
| 5,962,788 | A | * | 10/1999 | Fawcett .............. 73/514.36 |
| 6,089,088 | A | | 7/2000 | Charvet et al. |
| 6,098,462 | A | * | 8/2000 | Hulsing, II .............. 73/514.38 |
| 6,145,380 | A | * | 11/2000 | MacGugan .............. 73/493 |
| 6,199,430 | B1 | | 3/2001 | Kano et al. |
| 6,662,658 | B2 | * | 12/2003 | Foote .............. 73/514.29 |
| 6,912,902 | B2 | * | 7/2005 | Malametz et al. .......... 73/514.32 |

FOREIGN PATENT DOCUMENTS

| GB | 2 174 500 | 11/1986 |
| GB | 2 178 856 | 2/1987 |

OTHER PUBLICATIONS

United Kingdom Search Report, GB 07 22939.2, dated Feb. 14, 2008.

* cited by examiner

*Primary Examiner*—Helen C. Kwok
(74) *Attorney, Agent, or Firm*—Gardere Wynne Sewell LLP (57) ABSTRACT

A long-period weak-motion inertial sensor includes a frame having a frame mounting surface, a movable mass having a movable mass mounting surface, a transducer for sensing displacements of the movable mass with respect to the frame, and a monolithic flexure element for suspending the movable mass in the frame. The monolithic flexure element includes: a stiff frame integral clamp attachable to the frame mounting surface of the frame, a stiff movable mass integral clamp attachable to the movable mass mounting surface of the movable mass, and a stiffest flexible region for operatively connecting the frame integral clamp to the movable mass integral clamp. The frame and movable mass mounting surfaces do not overlap the stiffest flexible region, thereby minimizing the generation of creep and hysteresis noise. The variation in stiffness of the monolithic flexure element is controlled by varying thickness along the length of the flexure element.

20 Claims, 9 Drawing Sheets

INERTIAL SENSOR HAVING A FLEXING ELEMENT SUPPORTING A MOVABLE MASS

PRIORITY CLAIM

This application claims the benefit of Canadian Patent Application No. 2,569,159 of the same title which was filed on Nov. 28, 2006.

FIELD OF THE INVENTION

The present invention relates to the field of inertial sensors and more particularly to long-period weak-motion inertial sensors having flexing elements for supporting a movable mass in the sensor.

BACKGROUND

Inertial sensors are variously called seismometers, accelerometers, tiltmeters, gravimeters and geophones. The naming differs primarily according to the field of application. However with all of these types of sensor the common element is the detection of ground motion by sensing the motion of an inertial mass. A suspension mechanism typically consists of one or more leaf springs, called flexure elements or simply flexures, serves to constrain the motion of the inertial mass and balance the effect of gravity and typically provides a restoring force to the inertial mass.

Figure 1:
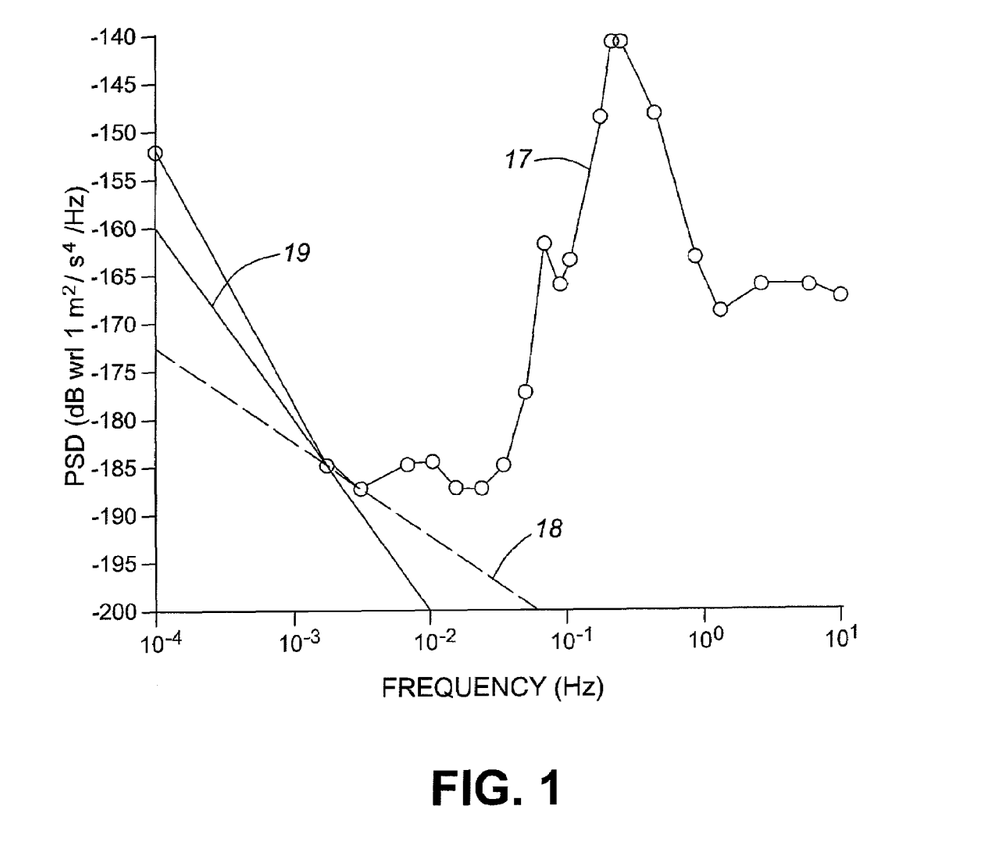
FIG. 1 illustrates a graph to show the practical limits of seismometer sensitivity.

FIG. 1 is a graph to illustrate a limitation on the sensitivity of an inertial sensor: the background shaking of the earth itself, commonly called the new low-noise model 17 or NLNM. A typical noise spectrum at a well-designed seismic vault can be many orders of magnitude higher than this, but will very rarely dip below the NLNM. The peak between 0.1 and 1 Hz is known as the microseismic peak. Frequencies below the microseismic peak are known as the long-period band of the seismic spectrum.

The ability of an inertial sensor to measure ground motion is impaired by its own internally generated noise. The internal noise level of an inertial sensor depends, among other things, on dimensional stability of the suspension mechanism that supports the inertial mass, and this is particularly critical at low frequencies. There are two types of long-period internal noise that are of particular concern: creep noise and hysteresis noise.

Flicker noise, variously called pink noise or 1/f noise, is found at low frequencies in most physical phenomena. Mechanical flicker noise in a pendulum is related to temperature and to the lossiness of the suspension. Because of the latter relationship—it will be referred to as hysteresis noise. Suspension hysteresis, also known as anelasticity, is quantified by measuring the phase shift between applied stress and resulting strain, called the loss angle. A hysteresis noise spectrum 18 at the level of the NLNM corresponds to a loss angle on the order of $3 \times 10^{-4}$ radians.

Sudden spontaneous changes in the apparent output acceleration of an inertial sensor relate to small changes in the tilt of the frame or to small displacements of the inertial mass. Because of the characteristic noise spectrum associated with these "pops" or "glitches" it is variously called red noise or $1/f^2$ noise; however, because of its origin it will be referred to as creep noise. In order to have a spectrum below the NLNM the square root of the sum of the squares of any spontaneous displacements should be less than approximately 0.25 nm in any hour. This level of creep noise 19 is also shown on FIG. 1.

A third source of noise is due to the fact that the earth is constantly moving in three axes of translation and three axes of rotation. A sensor should have a well-defined sensitive axis and have low off-axis sensitivity; otherwise off-axis ground motion will appear as noise. If the inertial mass is constrained to be more compliant in one axis than in any other it can be said to have a single effective degree of freedom.

If the instrument's ability to detect small signals at low frequencies is sufficient it becomes apparent that the sensor performance is limited by the three factors described above, among others. A long-period weak-motion inertial sensor is defined as one that can resolve signals below −160 dB with respect to 1 $m^2/s^3$ at frequencies below 0.1 Hz. At higher frequencies and amplitudes, the small spontaneous displacements and hysteresis loss described above cease to be a concern.

One approach to the design of long-period weak-motion inertial sensor suspensions is to use flat metal leaf springs, which are clamped with separate clamp pieces to the frame and movable mass of the inertial seismometer. This approach can have the following disadvantages:

As the flexing element changes shape it moves with respect to the clamp holding it. This interaction between the clamp and the flexing element will have a stick-slip characteristic, resulting in hysteresis noise;

Stresses induced by assembly or temperature changes can cause stresses at the clamp-flexure interface that are subsequently released as creep noise;

The clamps add cost in terms of parts count; and

Clamp edge alignment can significantly increase assembly time.

Another approach is to braze, weld or glue leaf springs to fixed and movable parts to form sub-assemblies which are in turn clamped, press-fit, shrink fitted or otherwise attached to the frame and movable mass. This approach can have the following disadvantages:

It is difficult to inspect and correct small voids in the joints between the leaf springs and fixed and movable pieces. Such voids can cause stick-slip friction and therefore hysteresis and/or creep noise;

Brazing materials and glue can have low yield strength and high loss angle resulting in high hysteresis noise;

Brazing and welding can cause localized high stresses in the part which are subsequently released as creep noise;

Such sub-assemblies are expensive as they typically require very specialized processes to manufacture;

A third approach is to construct the movable mass, suspension and frame as a monolithic structure. The movable mass is relatively large to keep the sensor self-noise low and relatively complex geometries are needed to keep the off-axis sensitivity low. To achieve these ends in an entirely monolithic structure is very costly. If creep and hysteresis noise can be minimized by some other approach then the expense is unnecessary.

There is a need to provide inertial sensors having suspension mechanisms that address at least some of the previously recited disadvantages.

SUMMARY

Certain exemplary embodiments provide a long-period weak-motion inertial sensor comprising: a frame having a frame mounting surface; a movable mass having a movable mass mounting surface; a transducer for sensing displacements of the movable mass with respect to the frame; and a monolithic flexure element for suspending the movable mass in the frame, the monolithic flexure element comprising: a stiff frame integral clamp attachable to the frame mounting surface of the frame; a stiff movable mass integral clamp attachable to the movable mass mounting surface of the movable mass; and a stiffest flexible region for operatively connecting the frame integral clamp to the movable mass integral clamp; wherein the frame and movable mass mounting surfaces do not overlap the stiffest flexible region, thereby minimizing the generation of creep and hysteresis noise, and wherein the variation in stiffness of the monolithic flexure element is controlled by varying thickness along the length of the monolithic flexure element.

DETAILED DESCRIPTION

Figure 2:
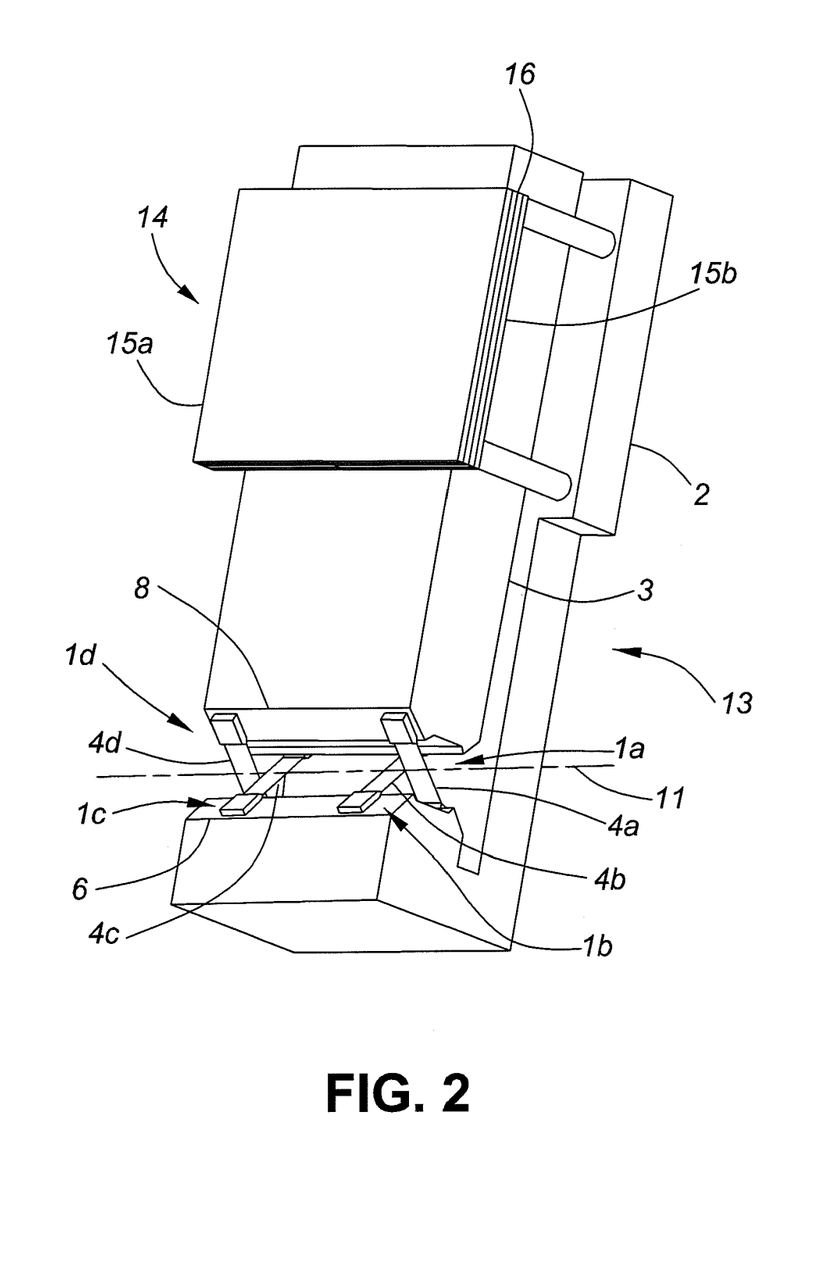
FIG. 2 illustrates an embodiment comprising two crossed pairs of monolithic flexure elements arranged to constrain the movable mass to a single rotational degree of freedom.

FIG. 2 shows an inertial sensor 13. The movable mass 3 is pivotably mounted on the frame 2 using four monolithic flexure elements 1. The flexible region 4 of each flexure element is some distance from the associated frame mounting surface 6 and movable mass mounting surface 8. All mounting surfaces 6 and 8 are typically well-controlled for flatness, angle and position. Alignment features may be provided on either the frame 2 or the movable mass 3. The mounting faces are positioned and oriented so that the flexible regions 4 cross at right angles and at their midpoints. As a result, the movable mass 3 in this embodiment has a single rotational degree of freedom around the axis of rotation 11 shown.

A transducer 14 for detecting relative motion is mounted on the frame 2 and movable mass 3. The transducer includes movable mass capacitor plates 15 mounted on the movable mass 3 and a fixed center capacitor plate 16 is mounted to the frame 2. The capacitor plates 15 and 16 are used in conjunction with electronics (not shown) to form a sensitive capacitive displacement transducer.

FIG. 2 shows a capacitive displacement transducer but other transducers can be used, including: linear variable differential transformers, coil-magnet assemblies and optical means including laser interferometric and shadow sensor methods.

Figure 3:
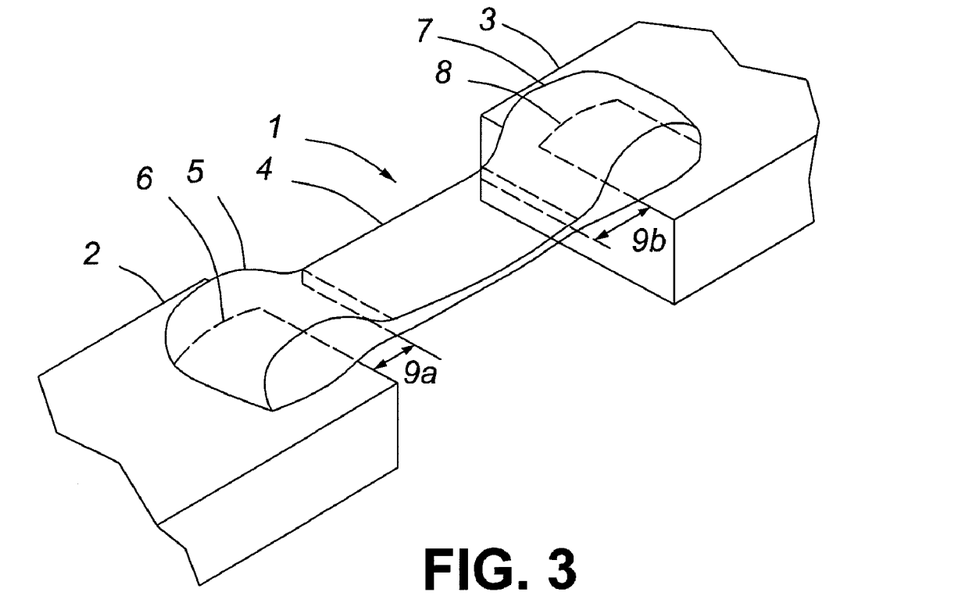
FIG. 3 illustrates the integral clamps, flexible regions and mounting surfaces of a generalized monolithic flexure element.

FIG. 3 shows a generalized monolithic flexure element 1 to illustrate the various regions of the flexure element 1. First, by way of background, the notion of stiffness will be described. The stiffness of a structure at a given point means the minimum area moment of inertia. For example, for a rectangular cross-section of a beam with width b and thickness t and modulus of elasticity E, the area moment of inertia I for bending around an axis which passes through the center of the thickness is $$I = \frac{bt^3}{12}$$

For a beam of a given length and modulus of elasticity, a large moment means the beam is stiff while a small moment means it is compliant. At a given point in a structure, any number of different area moments can be computed depending on the shape of the cross-section and the bending axis chosen.

The minimum value of the moment of inertia, chosen over all cross-sections and bending axes, is referred to as the minor principal area moment of inertia at that point.

A monolithic flexure element connects a frame integral clamp 5 and a movable mass integral clamp 7 along one or more paths, which are unsupported by the frame 2 or the movable mass 3. The path or paths with the greatest stiffness will have the most effect on the performance of the flexure element. The extent of a flexible region 4 associated with a given path is defined as follows: a flexible region 4 is a contiguous volume of substantially constant minor principal area moment of inertia having within it a point with minor principal area moment of inertia near the minimum value for the path. The notion of being "substantially constant" can be defined further by specifying a percentage variation from the minimum stiffness, say 30%, corresponding, for a flexure element 1 of constant width, to a variation of 10% from the minimum thickness.

The frame integral clamp 5 and movable mass integral clamp 7 are parts at the ends of the monolithic flexure element 1, which are substantially stiffer than the rest of the flexure element 1 and attached to the frame 2 and movable mass 3, respectively. The frame mounting surface 6 and movable mass mounting surface 8 are the surfaces of contact between the frame 2 and the movable mass 3, and are delineated by dashed lines in FIG. 3.

Once the flexible region 4 and mounting surfaces 6 and 8 have been identified in a given structure, the shortest distance 9 between the flexible region 4 and the frame and movable mass mounting surfaces 6 and 8 can be measured. Embodiments provide various structures in which the flexible region 4 and the mounting surfaces 6 and 8 do not overlap. The greater the distance 9, the more creep and hysteresis levels will be lowered, other factors being the same.

Figure 4:
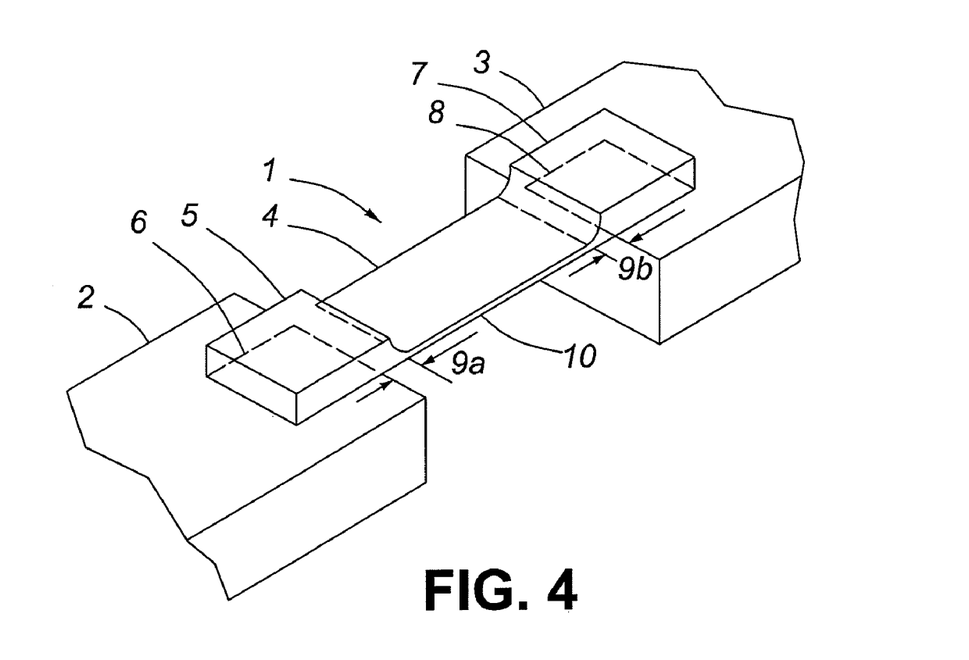
FIG. 4 illustrates an embodiment of a monolithic flexure element that has a datum surface parallel to the mid-plane of the flexible region.

FIG. 4 illustrates a single monolithic flexure element 1 according to an embodiment. The width of the flexure element 1 is kept substantially constant while the stiffness is varied by varying the thickness along the length.

The flexible region 4 has a substantially constant rectangular cross-section.

The frame integral clamp 5 and movable mass integral clamp 7 also have constant rectangular cross-section, with a thickness approximately five times greater than the flexible region 4. This ratio is hereafter called the aspect ratio of the flexure element 1. The 5:1 aspect ratio results in a 125:1 stiffness ratio.

The shortest distance 9 between the surfaces of the flexible region 4 and the frame mounting surface 6 and movable mass mounting surface 8 is shown. This shortest distance 9 is nine times the thickness of the flexible region 4. The mounting surfaces 6 and 8, delineated with dashed lines, are designed to be smooth and flat. Between the flexible region 4 and integral clamps 5 and 7 the flexure element 1 has a profile that is straight on one side and which is an arc with a roughly constant radius on the other. This arc is roughly perpendicular to the edge of the integral clamps 5 and 7 and tangent at the edge of the flexible region 4.

On one side, the flexure element 1 has a datum surface 10. This datum surface 10 is (a) useful in simplifying manufacturing as the part can be mounted on this face while material is removed; (b) aids in providing a datum surface 10 during inspection of the thickness of the flexible region 4; and (c) simplifies the design of the frame and movable mass mounting faces 6 and 8 in a complex assembly with multiple flexure elements 1.

The flexure element 1 can be made of a material with a low loss angle so that the flexure element material itself does not generate hysteresis noise. For example, the flexure element 1 can be manufactured from fully precipitation hardened beryllium copper UNS C172000. The precipitation hardening results in high strength and low creep. Other examples include the use of material with a low loss angle, such as sapphire, silicon, high strength steels (including maraging, C85, Ni-Span-C and Invar steels) and titanium alloys.

Depending on the corrosion resistance of the material chosen, the monolithic flexure element 1 can be plated with an inert metal or other corrosion inhibitor. For example, if the flexure element 1 is made from Ni-Span-C, then nickel or gold plating can be used to prevent corrosion.

The flexure element 1 can be manufactured by a process (such as photochemical etching) that induces minimal stresses in the part so that: (a) the flexure element 1, after manufacturing, is substantially flat, thereby minimizing stresses induced during assembly; and (b) the manufacturing process does not plastically deform the flexure element 1 in such a way as to cause excessive creep as these manufacturing stresses spontaneously dissipate after assembly. Other manufacturing processes include wire electrical discharge machining, plunge electrical discharge machining, bulk micromachining and electrodeposition.

In alternative embodiments in which fasteners such as machine screws are used, a load spreader such as a washer under the head of the machine screw can be used.

Figure 5:
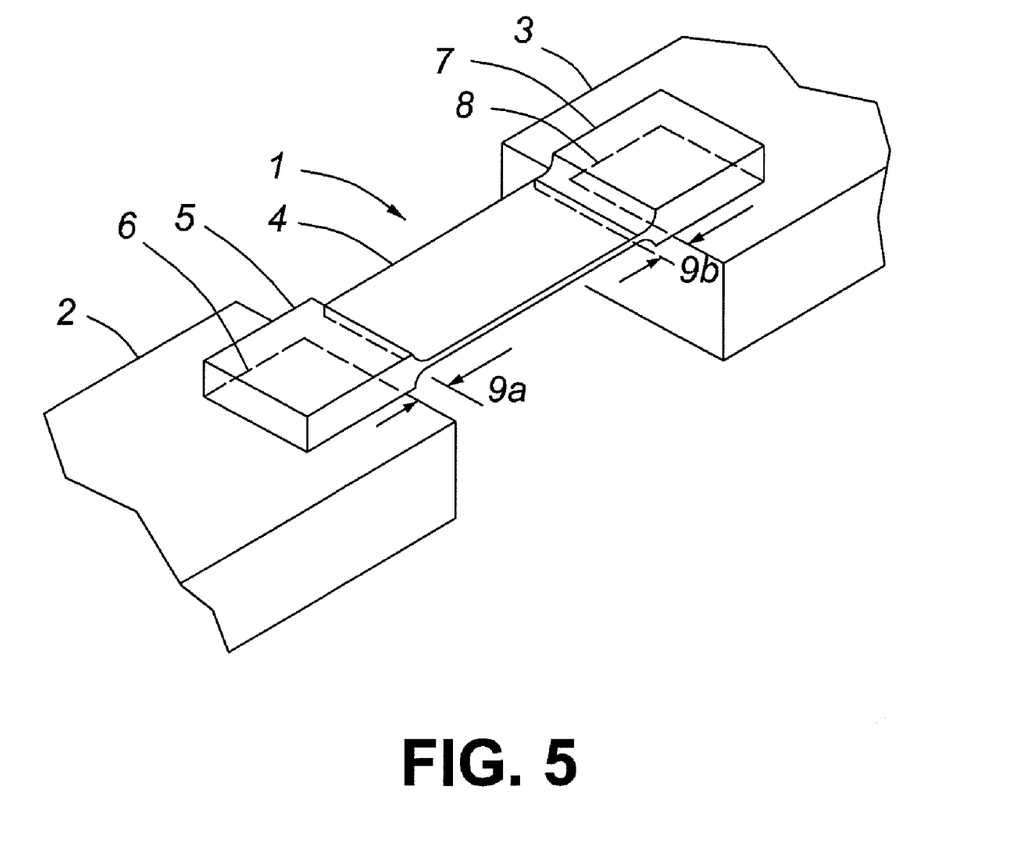
FIG. 5 illustrates an embodiment of the monolithic flexure element that is symmetric across the mid-plane of the flexible region.

FIG. 5 shows a single monolithic flexure element 1 in an alternative embodiment. The flexure element 1 is symmetric across the mid-plane of the flexible region 4. The resulting monolithic flexure element 1 will tend to be flatter than an asymmetric flexure element 1 as in the embodiment of FIG. 4. This is because stresses are induced in the surface layer of a metal sheet when it is rolled to final thickness. In a symmetric flexure element 1 roughly equal amounts of material are removed from each side so the stresses in the material that remains are approximately balanced. A flatter flexure element 1 will reduce stresses induced as the flexure elements 1 are straightened out from their initially curved rest position during assembly and thereby reduce creep noise and delay the onset of elastic buckling in the flexure element 1. The aspect ratio is 5:1 and the stiffness ratio is 125:1 as in the embodiment of FIG. 4, but the distance from the surface of the flexible region 4 to the mounting surfaces 6 and 8 is approximately seven times the thickness of the flexible region 4.

Figure 6:
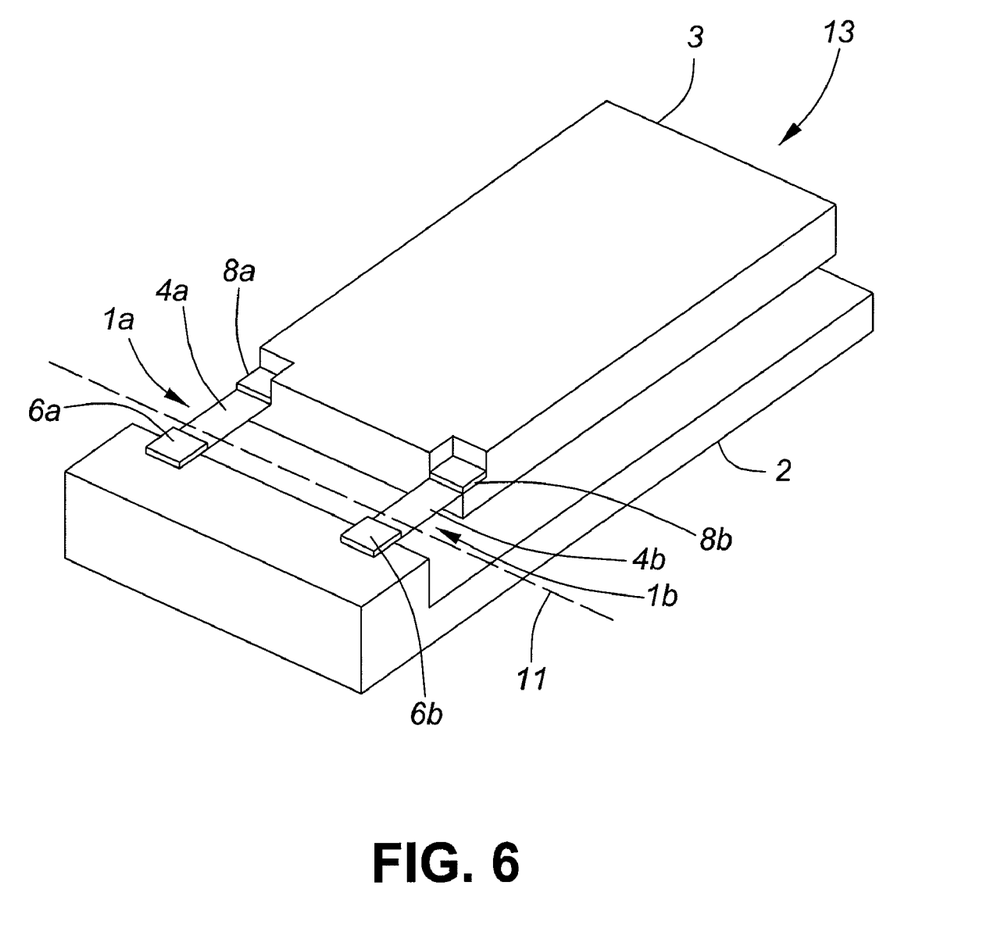
FIG. 6 illustrates an embodiment comprising two parallel and coplanar flexible regions arranged to constrain the movable mass to a single rotational degree of freedom.

FIG. 6 shows an alternative embodiment with a single rotational degree of freedom requiring just two coplanar flexure elements 1. The frame 2 and movable mass 3 each have two coplanar mounting surfaces 6 and 8 for the flexure elements 1. The flexure elements 1 are parallel along their lengths and widely spaced relative to their widths. In this arrangement, the movable mass 3 has a single effective rotational degree of freedom around the axis 11. The transducer is not illustrated for simplicity.

Figure 7:
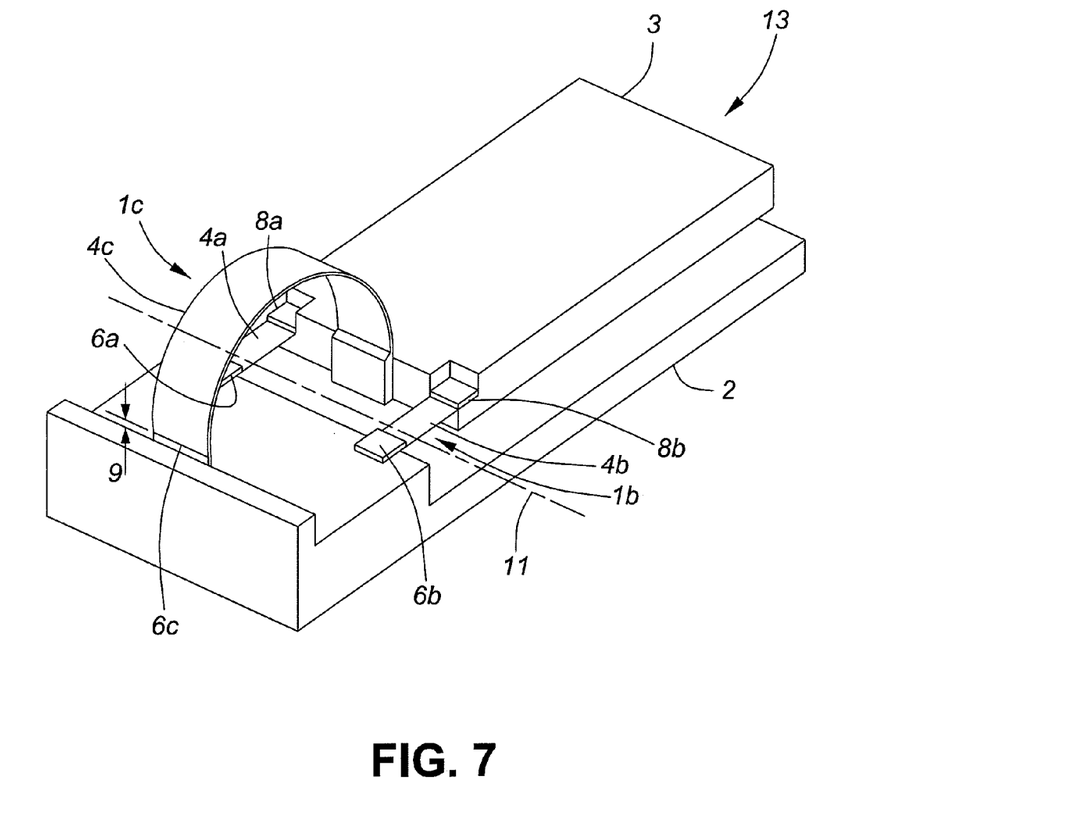
FIG. 7 illustrates an embodiment comprising two flexure elements with parallel and coplanar flexible regions arranged to constrain the movable mass to a single rotational degree of freedom and a third flexure element to balance the effect of gravity on the movable mass.

FIG. 7 shows an alternative embodiment similar having all of the features of FIG. 6 and having in addition a monolithic flexure element 1c, which can balance the effect of gravity on the movable mass 3 with respect to the frame 2. The transition region of this flexure element 1 stops short of the frame and movable mass mounting faces 6c and 8c by a distance 9, thus minimizing creep and hysteresis noise.

Figure 8:
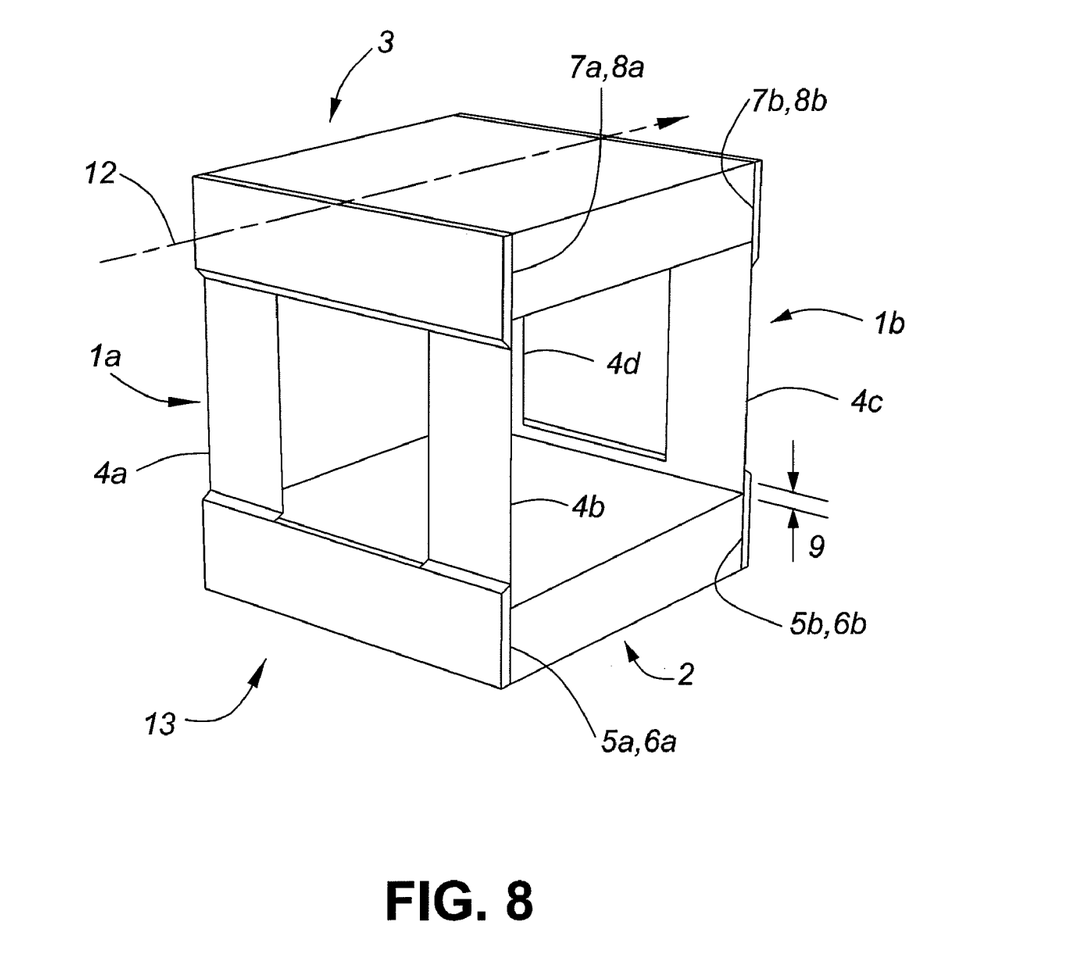
FIG. 8 illustrates an embodiment comprising two flexible regions that are parallel and widely spaced and arranged to constrain the movable mass to a single translational degree of freedom.

FIG. 8 shows an alternative embodiment with a single translational degree of freedom and two parallel but non-coplanar flexure elements 1, each having two coplanar flexible regions 4, which are substantially thinner than they are wide or long. The frame 2 and movable mass 3 have two parallel but non-coplanar mounting faces for the integral clamps 5 and 7 of the monolithic flexure elements 1. The distances 9 from the surfaces of the flexible regions 4 to the mounting surfaces 6 and 8 are identifiable, extending from the edge of the frame and movable mass mounting surfaces 6 and 8 to the edge of the flexible region 4. In this arrangement, the inertial sensor has a single effective translational degree of freedom along the direction 12. The transducer is not illustrated for simplicity.

This alternative embodiment is well-suited for horizontally oriented inertial sensors. It is less well suited for use in a vertical seismometer with a large inertial mass, as the flexure elements 1 will require precise forming and there is no simple way to adjust the balance point of the movable mass 3. The movable mass 3 travels not along a straight line but along an arc. This results in somewhat increased off-axis sensitivity. This fact can be used to advantage if the sensor is oriented as shown with the center-of-gravity of the movable mass 3 above the frame 2, forming an inverted pendulum, thereby lengthening the natural period and again confirming suitability for use in a horizontally oriented inertial sensor.

Figure 9:
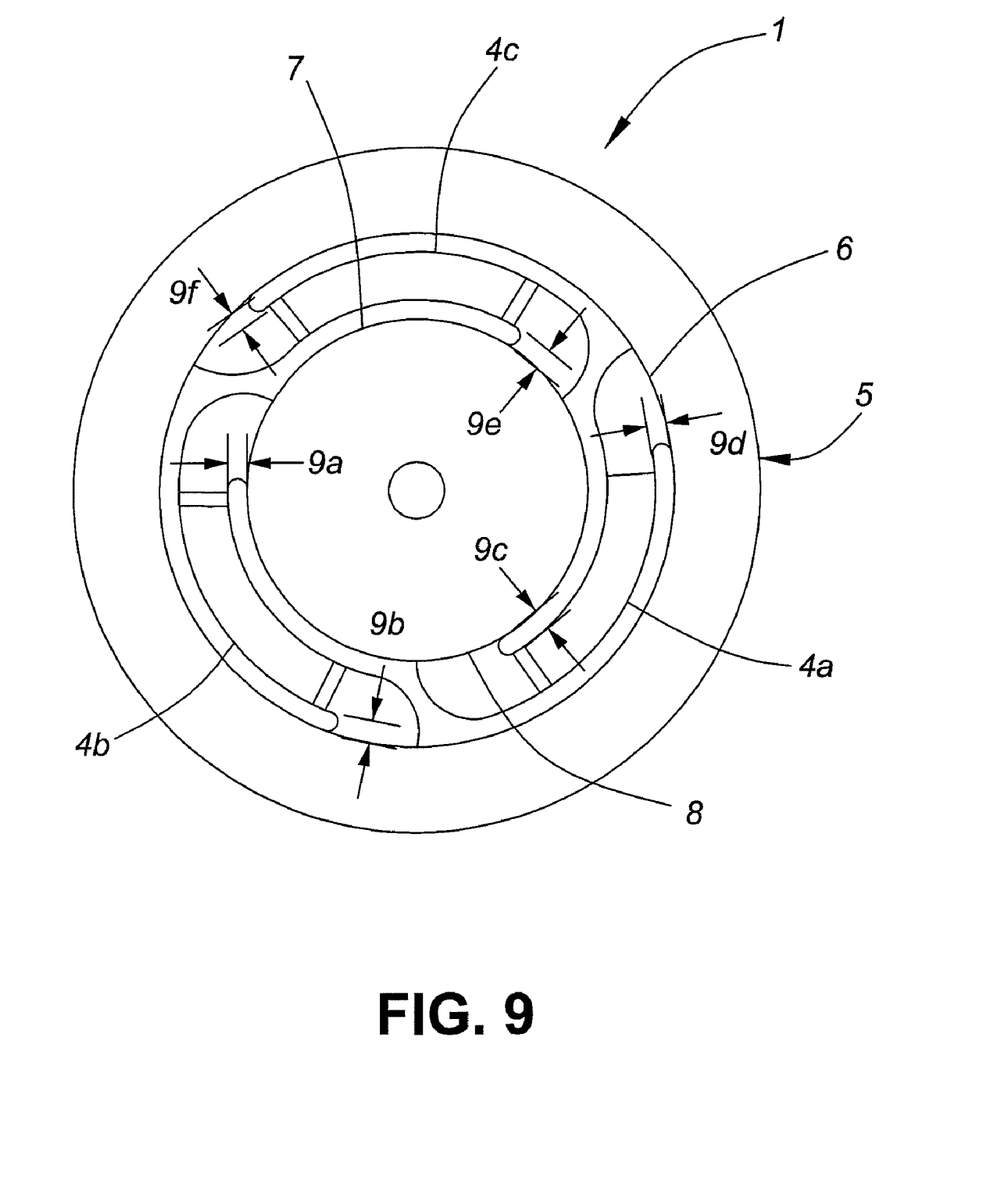
FIG. 9 illustrates an embodiment of the monolithic flexure element comprising flexible regions disposed symmetrically around the center of the flexure.

FIG. 9 shows the top view of another alternative embodiment for a monolithic flexure element 1. The flexure element 1 has an annular frame integral clamp 5 and a movable mass integral clamp 7, which is circular and concentric with the frame integral clamp 5. The edges of the frame mounting surface 6 and integral clamp mounting surface 8 are delineated with dashed lines. Three flexible regions 4 connect the frame integral clamp 5 to the movable mass integral clamp 7 in a circular arc of constant width, the extent of the flexible region 4 being delineated with dashed lines.

Alternative embodiments can have more than three flexible regions 4. Rather than forming circular arcs, the flexible regions 4 could be substantially straight segments, spiral arcs, or some other shape. Further, rather than having substantially constant width the flexible regions 4 could become wider or narrower in the middle.

The distances 9 from the edges of the flexible regions 4 to the edges of the mounting surfaces 6 and 8 are many times larger than the thickness of the flexible region 4. This separation helps to ensure that the elastic deformation of the flexible region 4 is substantially attenuated at the interface between the flexure elements 1 and the frame 2 and movable mass 3, thus minimizing creep and hysteresis noise.

Figure 10:
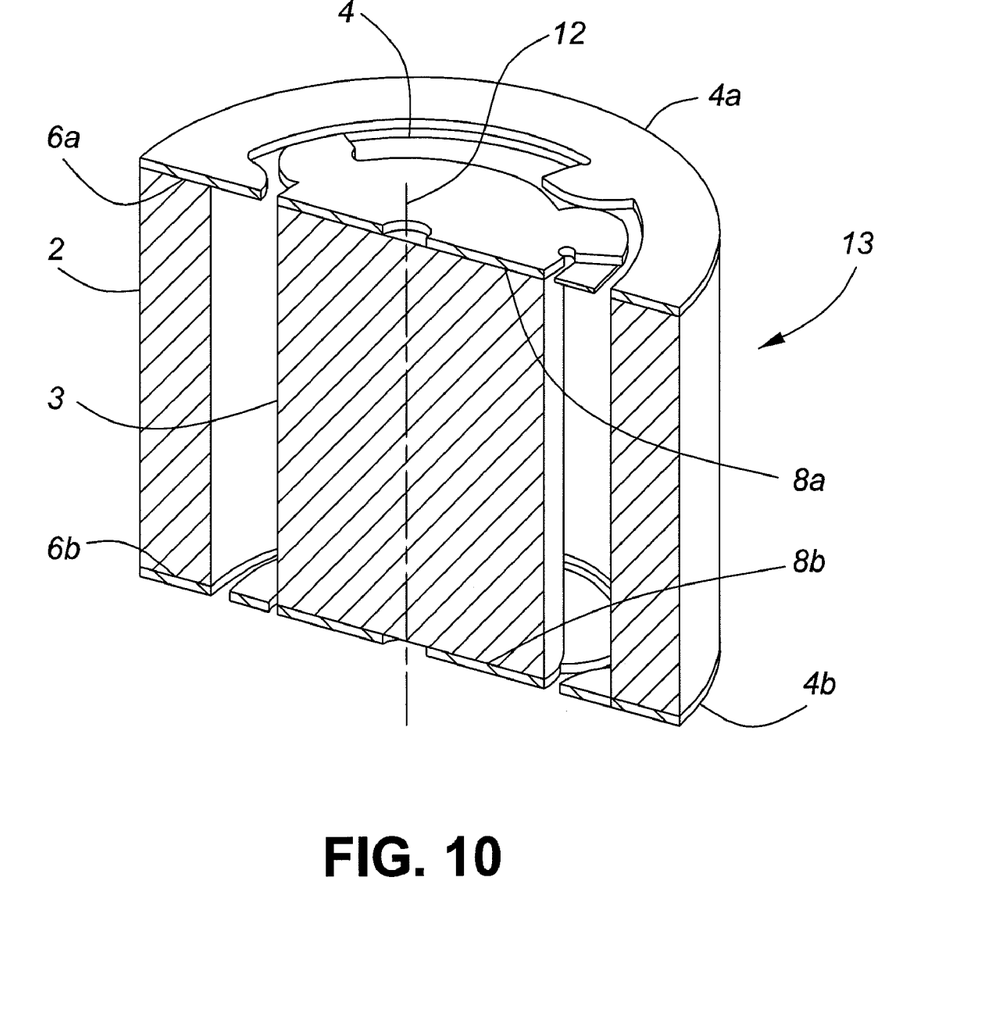
FIG. 10 illustrates an embodiment comprising two parallel and widely spaced monolithic flexure elements each comprising flexible regions disposed symmetrically around the center of the flexure with the flexure elements arranged to constrain the movable mass to a single translational degree of freedom.

FIG. 10 shows a cross-sectional view of an inertial sensor 13 that makes use of two of the flexure elements 1 from FIG. 9. The movable mass 3 is in the form of a cylinder. The movable mass mounting surfaces 8 are circular and parallel but not coplanar. The frame 2 is in the form of a hollow cylinder. The frame mounting surfaces 6 are annular and parallel but not coplanar. In alternative embodiments the frame 2 and movable mass 3 can be interchanged. The transducer is not illustrated for simplicity.

Since the flexible regions 4 are disposed symmetrically around the center of the flexure element 1, this arrangement results in a single translational degree of freedom along the direction of translation 12.

The invention claimed is:

1. A long-period weak-motion inertial sensor comprising:
a frame having a frame mounting surface;
a movable mass having a movable mass mounting surface;
a transducer for sensing displacements of the movable mass with respect to the frame; and
a monolithic flexure element for suspending the movable mass in the frame, the monolithic flexure element comprising:
a stiff frame integral clamp attachable to the frame mounting surface of the frame;
a stiff movable mass integral clamp attachable to the movable mass mounting surface of the movable mass; and
a stiffest flexible region for operatively connecting the frame integral clamp to the movable mass integral clamp;
wherein the frame and movable mass mounting surfaces do not overlap the stiffest flexible region, thereby minimizing the generation of creep and hysteresis noise, and
wherein variation in stiffness of the monolithic flexure element is controlled by varying thickness along the length of the monolithic flexure element.

2. The inertial sensor of claim 1, wherein the frame and movable mass integral clamps are at least thirty times as stiff as the flexible region.

3. The inertial sensor of claim 2, wherein the monolithic flexure element includes a material having a loss angle less than 10–3 radians.

4. The inertial sensor of claim 3, wherein two or more monolithic flexure elements are arranged to constrain the movable mass to have a single effective degree of freedom, wherein the degree of freedom is rotational and has a predetermined axis.

5. The inertial sensor of claim 4, comprising two pairs of flexure elements, wherein a distance between the two pairs of flexure elements is substantially larger than a width of each pair, and wherein the two elements in each pair are not parallel to each other.

6. The inertial sensor of claim 5, wherein flexible regions of the two pairs of flexure elements cross at midpoints of the flexure elements at right angles to each other.

7. The inertial sensor of claim 4, including a first and a second flexible region that are arranged to be coplanar and widely-spaced.

8. The inertial sensor of claim 7, including a third flexible region that is arranged to cross at right angles to and at the midpoint of the first and second regions.

9. The inertial sensor of claim 3, wherein two or more monolithic flexure elements are arranged to constrain the movable mass to have a single effective degree of freedom, wherein the degree of freedom is translational.

10. The inertial sensor of claim 9, including a first and second flexure element, the first and second flexure elements arranged to be substantially parallel, non-coplanar and spaced substantially further apart than a width of a flexible region.

11. The inertial sensor of claim 10, wherein the first flexure element includes a first and second flexible region wherein the first and second flexible regions are coplanar and a distance between the first and second flexible regions is substantially larger than the width of either flexible region, and the second flexure element includes a third and a fourth flexible region wherein the third and fourth flexible regions are coplanar and a distance between the third and fourth flexible region is substantially larger than the width of either flexible region.

12. The inertial sensor of claim 9, comprising two widely spaced monolithic flexure elements, wherein:
the frame integral clamp is substantially annular;
the movable mass integral clamp is substantially annular and concentric with and circumscribed by the frame integral clamp; and
each monolithic flexure element includes three or more flexible regions being symmetrically disposed around the center of the flexure element.

13. The inertial sensor of claim 3, wherein the monolithic flexure element supplies forces for balancing the effect of gravity on the movable mass.

14. The inertial sensor of claim 3, wherein the monolithic flexure element includes a datum plane defined by the frame and movable mass mounting surfaces and one surface of the flexible region.

15. The inertial sensor of claim 3, wherein the monolithic flexure element includes a plane of symmetry that bisects a thinnest dimension of the flexible region.

16. The inertial sensor of claim 3, wherein the monolithic flexure element includes sufficiently small residual internal stresses that the monolithic flexure element can be subjected to an appropriate aging heat treatment without changing shape by more than 1% of the length of the flexible region in a preinstalled state.

17. The inertial sensor of claim 3, wherein the monolithic flexure element includes a metal and a plating material, the plating material being dissimilar to the metal and chemically inert.

18. The inertial sensor of claim 3, wherein the monolithic flexure element is mounted to the frame and the movable mass by fasteners and load-spreading clamps for spreading stresses induced in contact areas of the fasteners.

19. The inertial sensor of claim 3, wherein the frame and movable mass mounting surfaces are arranged to be at least twice a thickness of the flexible region away from any surface of the flexible region.

20. The inertial sensor of claim 3, wherein the material is selected from the group consisting of: sapphire, silicon, high strength steels, beryllium copper, and titanium alloys.

* * * * *